United States Patent
Ferrari et al.

(10) Patent No.: US 11,937,527 B2
(45) Date of Patent: Mar. 26, 2024

(54) SYSTEM AND METHOD FOR DETERMINING RESIDUE COVERAGE WITHIN A FIELD FOLLOWING A HARVESTING OPERATION

(71) Applicant: CNH Industrial America LLC, New Holland, PA (US)

(72) Inventors: Luca Ferrari, Formigine (IT); Christopher Barrick, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 850 days.

(21) Appl. No.: 16/527,264

(22) Filed: Jul. 31, 2019

(65) Prior Publication Data
US 2021/0034867 A1    Feb. 4, 2021

(51) Int. Cl.
| | |
|---|---|
| A01B 79/00 | (2006.01) |
| A01B 69/00 | (2006.01) |
| B64C 39/02 | (2023.01) |
| B64U 101/30 | (2023.01) |
| G05D 1/00 | (2006.01) |
| G05D 1/02 | (2020.01) |
| G06T 7/11 | (2017.01) |
| G06V 20/10 | (2022.01) |

(52) U.S. Cl.
CPC .......... *A01B 79/005* (2013.01); *A01B 69/001* (2013.01); *A01B 69/004* (2013.01); *B64C 39/024* (2013.01); *G05D 1/0236* (2013.01); *G06T 7/11* (2017.01); *G06V 20/188* (2022.01); *B64U 2101/30* (2023.01); *G05D 2201/0201* (2013.01)

(58) Field of Classification Search
CPC .................................................. G06V 20/188
See application file for complete search history.

(56) References Cited

U.S. PATENT DOCUMENTS

| | | |
|---|---|---|
| 8,010,262 B2 | 8/2011 | Schroeder et al. |
| 8,463,510 B2 | 6/2013 | Knapp |
| (Continued) | | |

FOREIGN PATENT DOCUMENTS

| | | | |
|---|---|---|---|
| CN | 107079663 | * | 8/2017 |
| EP | 3145289 | | 8/2018 |

OTHER PUBLICATIONS

Holman, High Throughput Field Phenotyping of Wheat Plant Height and Growth Rate in Field Plot Trials Using UAV Based Remote Sensing (2016).*

(Continued)

*Primary Examiner* — Jean Paul Cass
(74) *Attorney, Agent, or Firm* — Rebecca L. Henkel; Rickard K. DeMille

(57) ABSTRACT

A method for determining residue coverage within a field after a harvesting operation may include receiving yield data associated with an estimated crop yield across a field and generating an estimated residue coverage map for the field based at least in part on the yield data. The method may further include receiving residue data associated with residue coverage across a surface of the field following the performance of a harvesting operation within the field. Additionally, the method may include generating an updated residue coverage map for the field based at least in part on the estimated residue coverage map and the residue data.

19 Claims, 7 Drawing Sheets

(56) References Cited

U.S. PATENT DOCUMENTS

| | | | |
|---|---|---|---|
| 9,282,688 B2 | 3/2016 | Casper et al. | |
| 9,554,098 B2 | 1/2017 | Casper et al. | |
| 10,029,812 B1 | 7/2018 | Crosby | |
| 10,255,670 B1* | 4/2019 | Wu | H04N 7/183 |
| 2012/0245802 A1 | 9/2012 | Schlesser et al. | |
| 2015/0040528 A1 | 2/2015 | Grotelueschen et al. | |
| 2015/0305224 A1 | 10/2015 | Casper et al. | |
| 2016/0078570 A1 | 3/2016 | Ethington | |
| 2016/0134844 A1 | 5/2016 | Casper et al. | |
| 2017/0112043 A1 | 4/2017 | Nair et al. | |
| 2017/0215330 A1 | 8/2017 | Missotten et al. | |
| 2018/0018517 A1* | 1/2018 | Zhong | G06F 18/22 |
| 2018/0049361 A1 | 2/2018 | Zemenchik | |
| 2018/0120133 A1* | 5/2018 | Blank | G01D 18/002 |
| 2018/0122020 A1 | 5/2018 | Blank et al. | |
| 2018/0146624 A1* | 5/2018 | Chen | G05B 13/0265 |
| 2018/0210450 A1 | 7/2018 | Ferrari et al. | |
| 2018/0310474 A1 | 11/2018 | Posselius et al. | |
| 2018/0336410 A1 | 11/2018 | Posselius | |
| 2018/0338422 A1 | 11/2018 | Brubaker | |
| 2019/0021226 A1* | 1/2019 | Dima | A01D 34/008 |
| 2019/0150357 A1* | 5/2019 | Wu | H04N 7/188 |
| 2019/0156255 A1* | 5/2019 | Carroll | G06Q 50/02 |
| 2019/0156437 A1* | 5/2019 | Dail | G06Q 10/0635 |
| 2019/0289786 A1* | 9/2019 | Prystupa | A01C 21/007 |
| 2020/0034759 A1* | 1/2020 | Dumstorff | G06Q 50/02 |
| 2020/0323133 A1* | 10/2020 | Anderson | H04W 4/38 |
| 2020/0326727 A1* | 10/2020 | Palla | A01D 41/127 |
| 2020/0337235 A1* | 10/2020 | Blank | A01M 21/043 |
| 2021/0015039 A1* | 1/2021 | Vandike | G06T 7/0002 |
| 2021/0034867 A1* | 2/2021 | Ferrari | B64C 39/024 |
| 2021/0176916 A1* | 6/2021 | Sidon | G06F 18/2321 |
| 2021/0321567 A1* | 10/2021 | Sidon | A01B 76/00 |

OTHER PUBLICATIONS

Bern, Remote Sensing of Thermal Water Stress Indicators in Peach, 10.17660/ActaHortic.2012.962.45 (2012).*

Cheng, Estimation of soil moisture content under high maize canopy coverage from UAV multimodal data and machine learning, Agricultural Water Management vol. 264, Apr. 30, 2022, 107530.*

Google patents machine translation of Chinese Patent Pub. No. CN 107079663A to Tatsuya et al. that was filed in 2013 (hereinafter "Tatsuya"). (Year: 2013).*

CROPPartner—Crop Residue Estimator, FieldTRAKS Solutions, dated Apr. 3, 2019, (1 page) https://www.fieldtraks.com/prod_cropresidue.html.

A. Laamrani et al., "Determining the Number of Measurements Required to Estimate Crop Residue Cover by Different Methods," Journal of Soil and Water Conservation, doi:10.2489/jswc.72.5.471, Sep./Oct. 2017—vol. 72, No. 5, pp. 471-479.

International Search Report and Written Opinion Corresponding to Application No. PCT/US2020/043949 dated Dec. 7, 2020 (12 pages).

* cited by examiner

SYSTEM AND METHOD FOR DETERMINING RESIDUE COVERAGE WITHIN A FIELD FOLLOWING A HARVESTING OPERATION

FIELD OF THE INVENTION

The present disclosure relates generally to determining residue coverage within a field and, more particularly, to systems and methods for using a combination of yield data and residue data to more accurately determine residue coverage after a harvesting operation.

BACKGROUND OF THE INVENTION

A harvester is an agricultural machine that is used to harvest and process crops. For instance, a forage harvester may be used to harvest silage crops, such as grass and corn. Similarly, a combine harvester may be used to harvest grain crops, such as wheat, oats, rye, barely, corn, soybeans, and flax or linseed. In general, harvesters typically perform several processes, which traditionally were distinct, in one pass of the machine over a particular part of the field. In this regard, most harvesters are equipped with a detachable harvesting implement, such as a header, which cuts and collects plant materials from the field. The harvester also includes a crop processing system, which performs various processing operations (e.g., threshing, separating, etc.) to separate the crops from the other plant materials received from the harvesting implement. The separated crop materials are stored in a crop tank of the harvester, while the remaining residue is discharged from harvester as the harvester is moved across the field.

The amount of the residue discharged from the harvester impacts later farming operations within the field. Specifically, farmers may adjust their tillage, fertilizing, and/or drainage practices based on the amount of residue present within the field to maximize crop growth and productivity. For example, farmers may choose to perform additional tillage on portion of the field in which high levels of residue are present to create a level and uniform layer of tilled soil across the field to form a proper seedbed for subsequent planting operations.

The amount of crop residue generated by a harvesting operation may be estimated based on the crop yield, with increasing crop yields generally corresponding to increased, crop residue. Typically, it is assumed that the crop residue is distributed relatively evenly behind the harvester, with uniform thickness and coverage. However, due to the operating parameters of the harvester, such as the speed of the harvester or the operation of the residue spreader, the crop residue is often not spread evenly behind the harvester. For example, there may be areas with little or no residue coverage while other areas may include significantly thick patches of residue coverage.

Accordingly, an improved system and method for determining the residue coverage within a field after a harvesting operation would be welcomed in the technology.

BRIEF DESCRIPTION OF THE INVENTION

Aspects and advantages of the invention will be set forth in pail in the following description, or may be obvious from the description, or may be learned through practice of the invention.

In one aspect, the present subject matter is directed to a method for determining residue coverage within a field. The method includes receiving, with one or more computing devices, yield data from a yield sensor associated with an estimated crop yield across a field. Further, the method includes generating, with the one or more computing devices, an estimated residue coverage map for the field based at least in part on the yield data. Moreover, the method includes receiving, with the one or more computing devices, residue data from a residue sensor associated with residue coverage across a surface of the field following the performance of a harvesting operation within the field. Additionally, the method includes generating, with the one or more computing devices, an updated residue coverage map for the field based at least in part on the estimated residue coverage map and the residue data.

In an additional aspect, the present subject matter is directed to a system for determining residue coverage within a field. The system includes a yield sensor that generates yield data indicative of an estimated crop yield for a field, a residue sensor that generates residue data indicative of residue coverage across a surface of the field following a performance of a harvesting operation within the field, and one or more computing devices. The one or more computing devices are configured to receive the yield data from the yield sensor. Further, the one or more computing devices are configured to generate an estimated residue coverage map for the field based at least in part on the yield data. Moreover, the one or more computing devices are configured to receive the residue data from the residue sensor. Additionally, the one or more computing devices are configured to generate an updated residue coverage map for the field surface based at least in part on the estimated residue coverage map and the residue data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
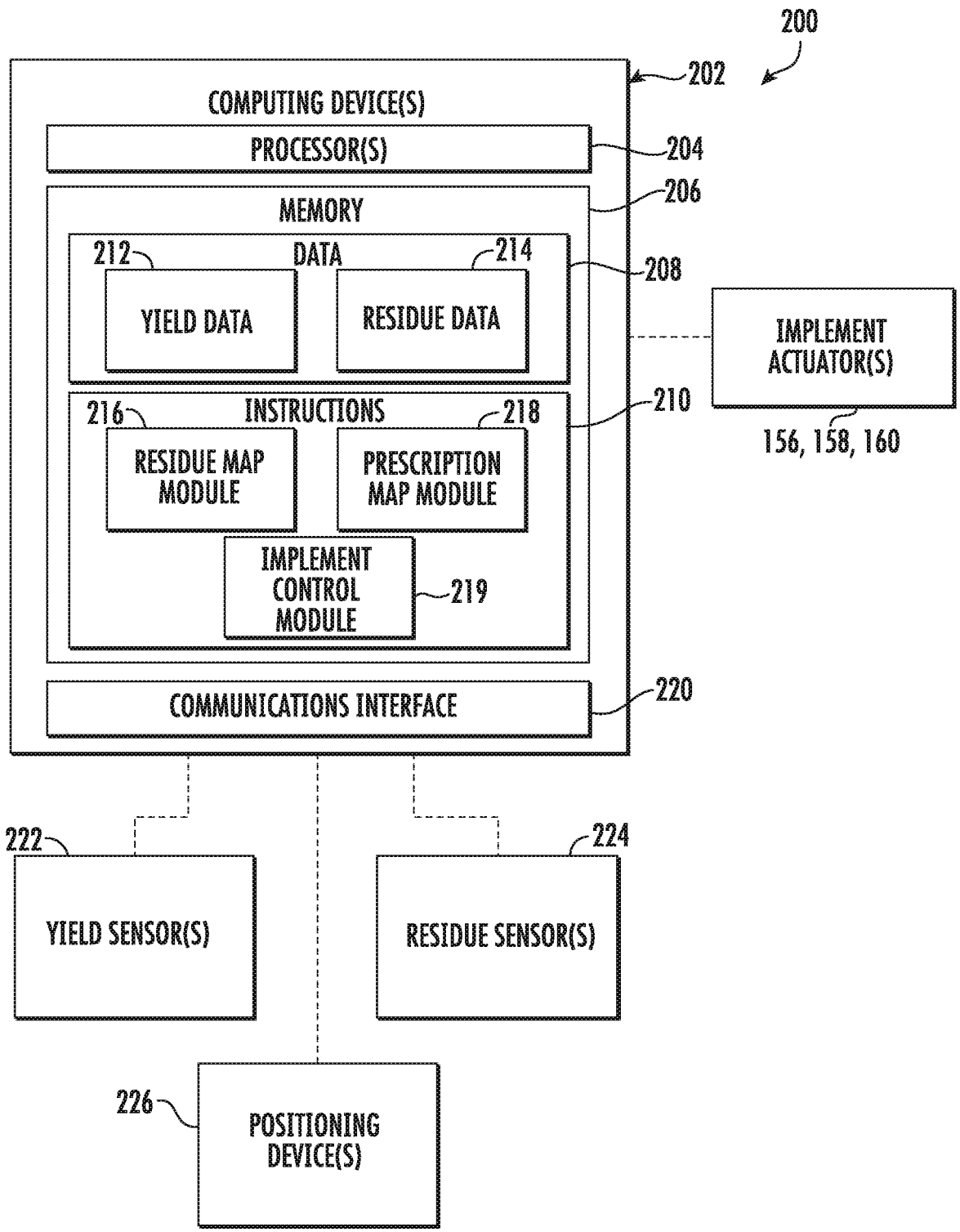
FIG. 1 illustrates a schematic view of one embodiment of a system for determining residue coverage of a field after a harvesting operation in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the residue coverage of a field after a harvesting operation within the field. Specifically, in several embodiments, one or more computing devices of the disclosed system may be configured to determine an estimated yield for a harvesting operation based on yield data received from one or more yield sensors. In one embodiment, the yield sensor(s) may be provided in operative association with the harvester performing the harvesting operation and/or with an unmanned aerial vehicle(s). For instance, the yield sensor(s) associated with the harvester and/or the unmanned aerial vehicle(s) may be configured to detect the crop density or coverage across the field before the performance of the harvesting operation, which may be used to estimate the yield of each area within the field. Alternatively or additionally, the yield sensor(s) may form part of a yield monitoring system of the harvester, in which case such yield sensor(s) may be configured to detect parameters associated with the crop materials processed by the crop processing system of the harvester, such as the weight of the processed crop material, which may be used to estimate the crop yield for the harvesting operation. Based on the estimated yield data determined at various locations across the field, the computing device(s) may be configured to generate an estimated residue coverage map for the field. For instance, the yield data may be geo-referenced such that an estimated crop yield can be determined at each location within the field, which may then be used to estimate the amount of crop residue that will be expelled from the harvester at such locations. The estimated amount of crop residue may then be used to generate an estimated residue coverage map for the field.

Moreover, in accordance with aspects of the present subject matter, the computing device(s) of the disclosed system may be configured to validate or update the estimated residue coverage map based on subsequent residue-related data captured following the harvesting operation. For example, in instances in which the estimated residue coverage map is generated based on the assumption that the crop residue expelled from the harvester is spread evenly across the field, the subsequently captured residue data may be used to update the map to account for uneven residue spreading or distribution. In one embodiment, one or more residue sensors may be provided in operative association with the harvester, a UAV, and/or a secondary agricultural implement, such as a tillage implement. The residue sensor(s) may be configured to collect data indicative of the residue coverage and/or thickness across the field, such as moisture content data, light reflectance data, heat data, or image data. The computing device(s) may then generate an updated residue coverage map based on the estimated residue coverage map and the associated residue data.

Additionally, in some embodiments, the computing device(s) may be configured to generate a prescription map for the field, which may then be used to control the operation of an agricultural implement during the performance a subsequent field operation. For example, the computing device(s) may generate a tillage prescription map for controlling the tool depth, tool angle, and/or the speed associated with a tillage implement during the performance of a subsequent tillage operation.

Figure 2:
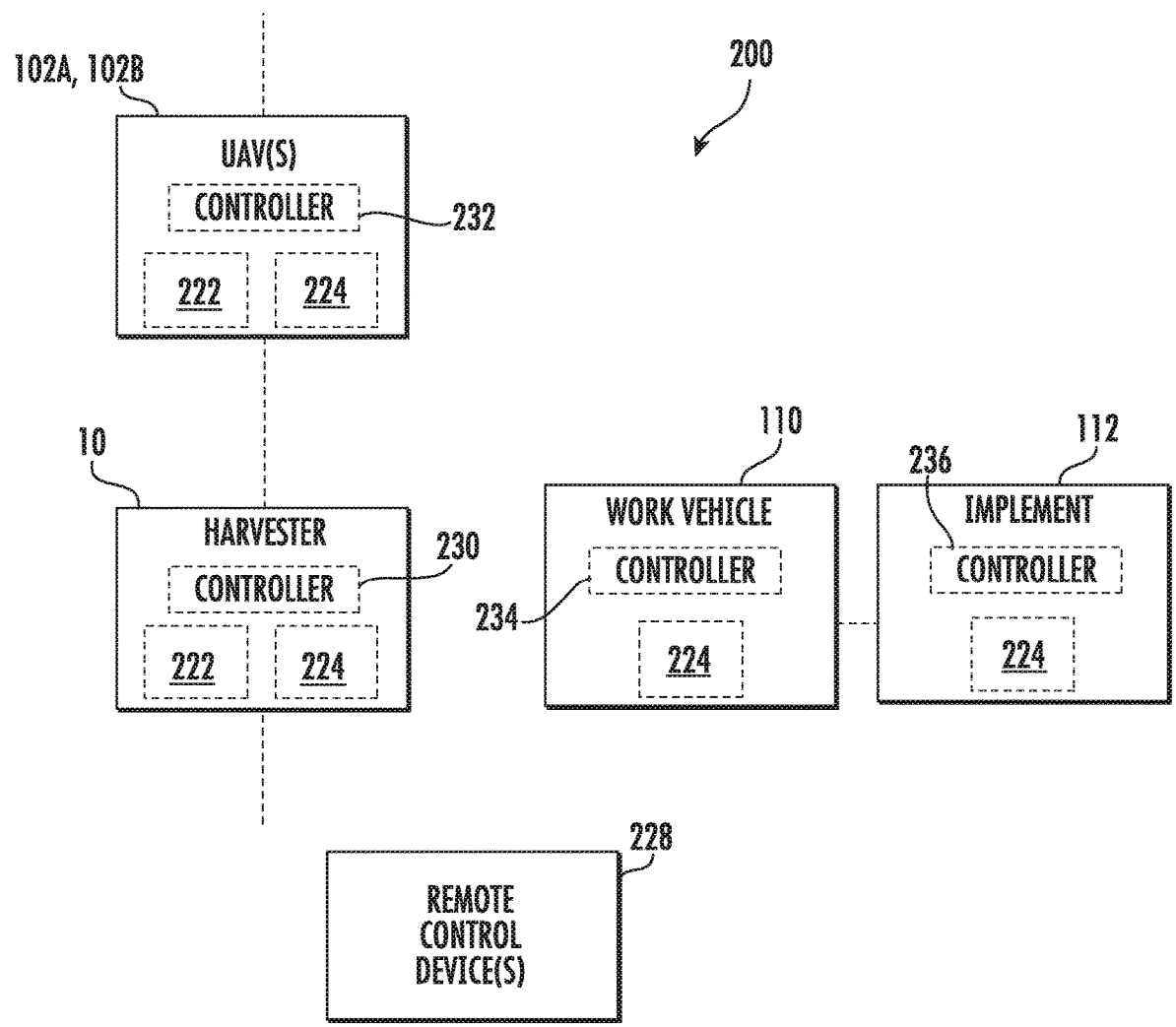
FIG. 2 illustrates another schematic view of the disclosed system for determining the residue coverage of a field in accordance with aspects of the present subject matter.

Referring now to FIGS. 1 and 2, schematic views of a system 200 for determining the residue coverage of a field after a harvesting operation are illustrated in accordance with aspects of the present subject matter. In several embodiments, the system 200 may include one or more computing devices 202 and various other components configured to be communicatively coupled to and/or controlled by the computing device(s) 202, such as one or more yield sensors 222 and one or more residue sensors 224. As will be described below, the computing device(s) 202 may be configured to generate a residue coverage map for at least a portion of a field based at least in part on yield data captured by the yield sensor(s) 222 and residue data captured by the residue sensor(s) 224 of such portion of the field. In particular, FIG. 1 illustrates a computing environment in which the computing device(s) 202 can operate to generate a residue coverage map for at least a portion of a field based on yield data received from the yield sensor(s) 222 and residue data received from the residue sensor(s) 224 and, further, to generate a prescription map for the portion of the field based on the residue coverage map. Additionally, FIG. 2 illustrates a schematic view showing exemplary agricultural implements relative to which the yield sensor(s) 222 and/or the residue sensor(s) 224 may be installed in accordance with aspects of the present subject matter.

In general, the computing device(s) 202 may correspond to any suitable processor-based device(s), such as a computing device or any combination of computing devices. Thus, as shown in FIG. 1, the computing device(s) 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

In several embodiments, the data 208 may be stored in one or more databases. For example, the memory 206 may include a yield database 212 for storing yield data received from the yield sensor(s) 222. For instance, the yield sensor(s) 222 may be configured to continuously or periodically capture yield data associated with portion(s) of the field before or during a harvesting operation within the field. For example, as shown in FIG. 2, one or more of the yield sensors 222 may be associated with a harvester 10 configured to perform a harvesting operation within the field and/or at least one unmanned aerial vehicle (UAV) 102A, 102B configured to fly over the field before the harvesting operation, as will be further described below. In such an embodiment, the yield data transmitted to the computing device(s) 202 from the yield sensor(s) 222 may be stored within the yield database 212 for subsequent processing and/or analysis, it should be appreciated that, as used herein, the term "yield data" may include any suitable type of data received from the yield sensor(s) 222 that allows for the crop yield of the field to be analyzed and/or estimated, as will be described in greater detail below.

Additionally, as shown in FIG. 1, the memory 206 may include a residue database 214 for storing information received from the residue sensor(s) 224 that is related to crop residue covering a surface of the field after the performance of the harvesting operation. For instance, the residue sensor(s) 224 may be configured to continuously or periodically capture residue data of portion(s) of the field after a harvesting operation within the field, and before a subsequent ground working operation. For example, as shown in FIG. 2, one or more of the residue sensors 224 may be associated with the harvester 10 performing the harvesting operation within the field, one or more UAV(s) 102A, 102B, a work vehicle 110 configured to tow an agricultural implement 112 during the performance a subsequent operation within the field, and/or the agricultural implement 112 itself, as will be further described below. In such an embodiment, the residue data transmitted to the computing device(s) 202 from the residue sensor(s) 224 may be stored within the residue database 214 for subsequent processing and/or analysis. It should be appreciated that, as used herein, the term "residue data" may include any suitable type of data received from the residue sensor(s) 224 that allows an indication of the amount of crop residue within the field to be analyzed and/or estimated, as will be described in greater detail below.

It should be appreciated that, in several embodiments, both the yield data 212 and the residue data 214 may be geo-referenced or may otherwise be stored with corresponding location data associated with the specific location at which such data was collected within the field. In one embodiment, the yield data 212 and the residue data 214 may be correlated to a corresponding position within the field based on location data received from one or more positioning devices. For instance, the computing device(s) 202 may be communicatively coupled to a positioning device(s) 226, such as a Global Positioning System (GPS) or another similar positioning device, configured to transmit a location corresponding to a position of the sensor(s) 222, 224 within the field when yield and/or residue data is collected by the sensor(s) 222, 224.

Referring still to FIG. 1, in several embodiments, the instructions 210 stored within the memory 206 of the computing device(s) 202 may be executed by the processor(s) 204 to implement a residue map module 216. In general, the residue map module 216 may be configured to analyze the yield data 212 deriving from the yield sensor(s) 222 to generate a baseline or estimated residue coverage map for the field. For instance, as described above, the yield data 212 detected by the yield sensor(s) 222 may correspond to the crop yield at a position within the field, e.g., the crop yield of a swath of the field. The residue map module 216 may correlate the crop yield detected by the yield sensor(s) 222 to an estimated amount of residue using a known correlation. Generally, as crop yield increases, the amount of residue also increases. The residue map module 216 may then generate an estimated residue coverage map for the field indicating a residue coverage for each position within the field based on the estimated amount of residue. For example, the estimated residue coverage map may be generated based on the assumption that the estimated amount of residue at a position of the field is spread evenly across the position within the field, e.g., across the swath after the harvesting operation, such that the residue coverage (e.g., thickness and/or distribution) is uniform. As such, the actual residue coverage of the field may differ from the estimated residue coverage of the field indicated by the estimated residue coverage map.

Accordingly, the residue map module 216 may further be configured to analyze the residue data 214 deriving from the residue sensor(s) 224 to update the estimated residue coverage map, thereby allowing an updated residue coverage map for the field to be generated. For instance, as described above, the residue data 214 detected by the residue sensor(s) 224 may correspond to a parameter indicative of residue coverage at a position within the field, e.g., across the swath of the field after the harvesting operation. The residue map module 216 may generally correlate the parameter indicative of residue coverage to the actual residue coverage (e.g., an amount and/or distribution of crop residue) at each position. The residue map module 216 may then, for example, be configured to compare the residue coverage for each position within the estimated residue map to the residue coverage for each position detected by the residue sensor(s) 224. The residue map module 216 may generate an updated residue coverage map 214 by updating the estimated residue coverage map 214 based on the comparison of the estimated residue coverage map and the residue data 214. As an example, the residue map module 216 can perform some or all of the method elements of the method 300 described below with reference to FIG. 8.

Moreover, as shown in FIG. 1, the instructions 210 stored within the memory 206 of the computing device(s) 202 may also be executed by the processor(s) 204 to implement a prescription map module 218. In general, the prescription map module 218 may be configured to analyze the updated residue coverage map to generate a prescription map for performing a subsequent agricultural operation within the field. In particular, as will be discussed further below, the prescription map module 218 may correlate the residue coverage at each position within the updated residue coverage map to operational settings for one or more parameters for performing the subsequent agricultural operation for each position, such as tool depth, tool angle, and/or speed. Generally, different amounts of residue will require different operational settings for each parameter. For example, deeper tillage depths are required during a subsequent tillage operation for areas of a field with thicker crop residue. The prescription map module 218 may then generate a prescription map that indicates operational settings for each parameter at each position within the field which may then be used to perform the subsequent agricultural operation.

Additionally, as shown in FIG. 1, the instructions 210 stored within the memory 206 of the computing device(s) 202 may also be executed by the processor(s) 204 to carry out an implement control module 219. In general, the implement control module 219 may be configured to control the operation of an agricultural implement based on the prescription map generated by the prescription map module 218. For example, as will be described below, the computing device(s) 202 may be configured to adjust one or more parameters of the implement, e.g., the implement 112 (FIG. 2), while performing the subsequent agricultural operation based on the prescription map such that a suitable amount of residue is incorporated within the field.

Referring still to FIG. 1, the computing device(s) 202 may also include a communications interface 220 to provide a means for the computing device(s) 202 to communicate with any of the various system components described herein. For instance, one or more communicative links or interfaces (e.g., one or more data buses) may be provided between the communications interface 220 and the yield sensor(s) 222 to allow yield data transmitted from the yield sensor(s) 222 to be received by the computing device(s) 202. Similarly, one or more communicative links or interfaces (e.g., one or more data buses) may be provided between the communications interface 220 and the residue sensor(s) 224 to allow the residue data transmitted from the residue sensor(s) 224 to be received by the computing device(s) 202. Additionally, as will be described below, one or more communicative links or interfaces (e.g., one or more data buses) may be provided between the communications interface 220 and any system components configured to carry out one or more of the elements of the disclosed method for determining the residue coverage of a field after a harvesting operation. For example, as illustrated, the computing device(s) 202 may be communicatively coupled to the implement 112, particularly to components of the implement 112, e.g., actuators 156, 158, 160 of the implement 112, to adjust the operation of the implement 112 as will be described below.

It should be appreciated that the one or more computing devices 202 may correspond to an existing controller of one or more of the harvester 10, UAV(s) 102A, 102B, work vehicle 110, and/or implement 112. For instance, the computing device(s) 202 may correspond to one of, or a combination of, a harvester controller 230 of the harvester 10, a UAV controller(s) 232 of the UAV(s) 102A, 102B, a work vehicle controller 234 of the work vehicle 110, and/or an implement controller 236 of the implement 112, as shown in FIG. 2. However, the computing device(s) 202 may also correspond to a controller of one or more remote control devices 228 separate from the harvester 10, UAV(s) 102A, 102B, work vehicle 110, and implement 112. For example, the remote control device(s) 228 may correspond to a stand-alone component or may be incorporated into or form part of a separate component or assembly of components. For example, in one embodiment, the remote control device(s) 228 may form part of a base station. In such an embodiment, the base station may be disposed at a fixed location, such as a farm building or central control center, which may be proximal or remote to the field, or the base station may be portable, such as by being transportable to a location within or near the field. In other embodiments, the remote control device(s) 228 may correspond to or form part of a remote cloud-based computing system located remote to the field.

Figure 3:
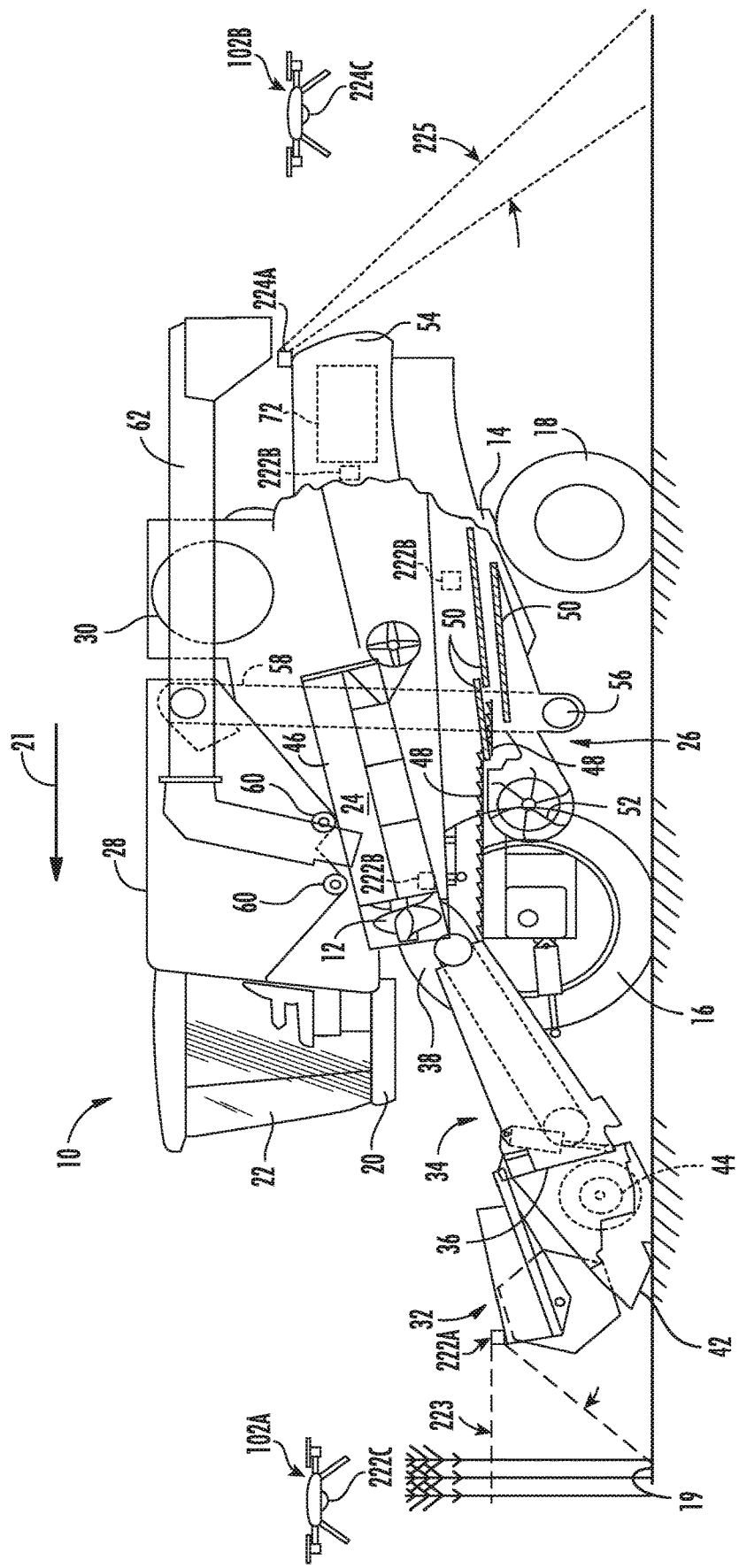
FIG. 3 illustrates one embodiment of a harvester and UAVs suitable for use within an exemplary embodiment of a system for determining residue coverage of a field after a harvesting operation in accordance with aspects of the present subject matter.
Figure 4:
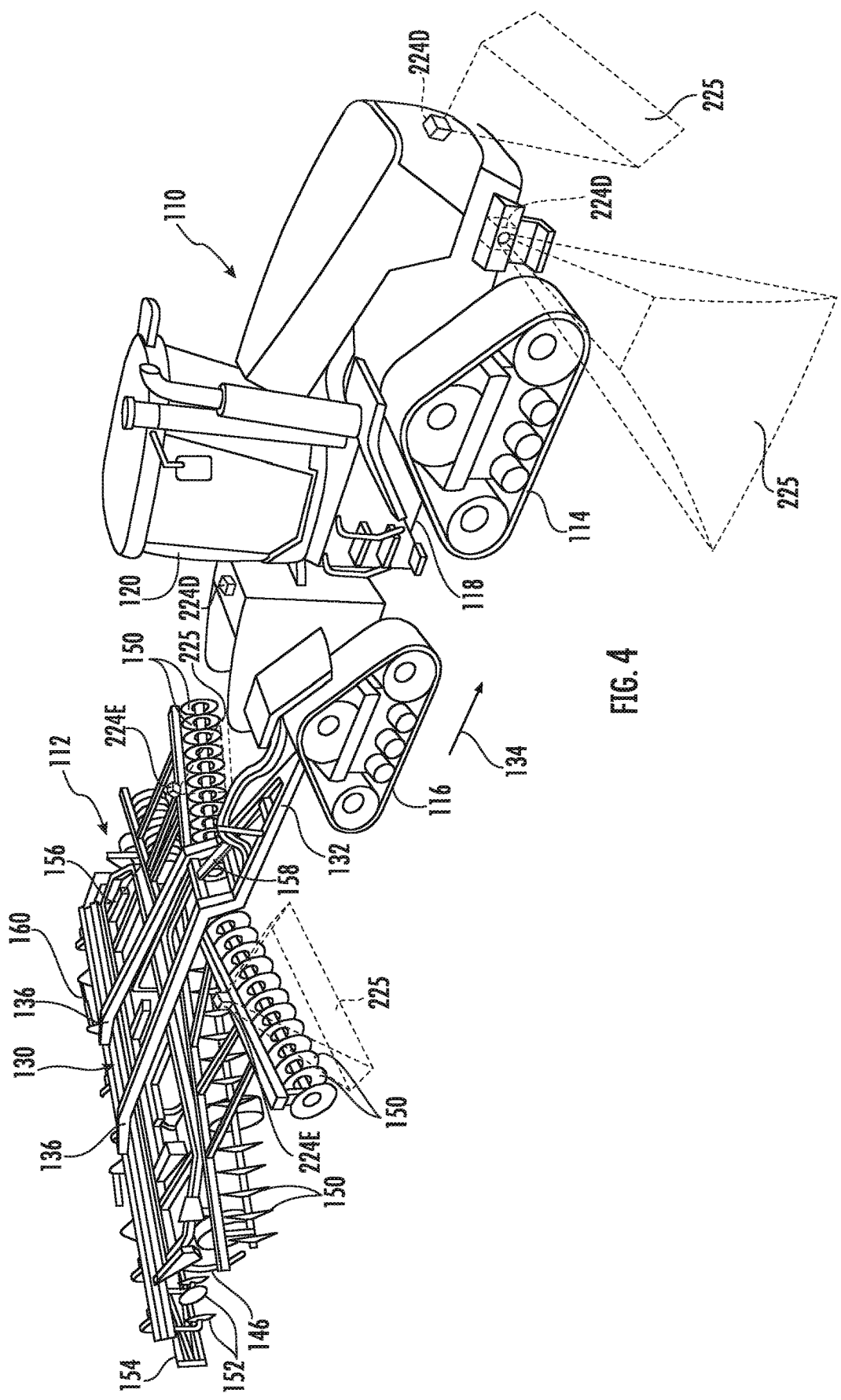
FIG. 4 illustrates one embodiment of a tillage implement suitable for use within an exemplary embodiment of system for determining residue coverage of a field after a harvesting operation in accordance with aspects of the present subject matter.

Referring now to FIGS. 3 and 4, exemplary views of components and/or machines suitable for use with the system 200 for determining the residue coverage of a field after a harvesting operation are illustrated in accordance with aspects of the present subject matter. More particularly, FIG. 3 illustrates a simplified, partial sectional side view of one embodiment of an agricultural harvester and UAVs suitable for use within an embodiment of the disclosed system 200. Additionally, FIG. 4 illustrates a simplified perspective view of a tillage implement suitable for use within an embodiment of the disclosed system 200.

As indicated above, the system 200 may, in several embodiments, include an agricultural harvester, such as the harvester 10 shown in FIG. 3. As shown in FIG. 3, the harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18 configured to support the harvester 10 relative to a ground surface 19 and move the harvester 10 in a forward direction of movement (indicated by arrow 21) relative to the ground surface 19. Additionally, an operator's platform 20 with an operator's cab 22, a threshing and separating assembly 24, a grain cleaning assembly 26 and a holding tank 28 may be supported by the frame 14. Additionally, as is generally understood, the harvester 10 may include an engine and a transmission mounted on the frame 14 for driving the wheel(s) 16, 18.

Moreover, as shown in FIG. 3, a harvesting implement (e.g., a header 32) and an associated feeder 34 may extend forward of the main frame 14 and may be pivotally secured thereto for generally vertical movement to set the desired harvesting or cutting height for the header 32. In general, the feeder 34 may be configured to serve as support structure for the header 32 and may extend between a front end 36 coupled to the header 32 and a rear end 38 positioned adjacent to the threshing and separating assembly 24.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material spreading out via oscillation of the pans 48 and/or sieves 50 and eventually falling through apertures defined in the sieves 50 into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Additionally, a cleaning fan 52 may be positioned adjacent to one or more of the sieves 50 to provide an air flow through the sieves 50, the air flow blowing chaff and other impurities off of the crop material for discharge from the harvester 10 through the outlet of a straw or residue hood 54. Moreover, the harvester 10 may further include a residue spreader 72 configured to assist in the discharge of the residue (e.g., the straw, chaff, impurities, and/or the like) from the residue hood 54 as the harvester is moved across the field. The spreader 72 may be actuatable to adjust the spread width of the residue (e.g., the lateral width of the stream of residue) being discharged from the harvester 10.

Moreover, in some embodiments, as described above, one or more of the yield sensors 222 of the system 200 may be provided in operative association with the harvester 10 and configured for directly or indirectly monitoring the crop throughput or yield of the field. For example, the harvester 10 may have one or more first yield sensors 222A positioned at a front end of the harvester, e.g., at the header 32. The first yield sensor(s) 222A may have a field of view 223 directed towards the field forward of the harvester 10 in the direction of travel 21. The first yield sensor(s) 222A may be configured to detect parameters indicative of the density of the crop to be harvested, which may then be used to estimate the crop yield and associated crop residue expelled from the harvester. For instance, the first yield sensor(s) 222A may be configured to detect parameters such as Normalized Difference Vegetation Index (NDVI) data or other image data. NDVI data and other image data may be analyzed to determine the approximate crop density at locations within the field. For example, NDVI data may be automatically analyzed using one or more computer based algorithms to determine the intensities of certain colors within a field. Higher NDVI values typically correspond to higher crop densities, and thus higher crop yields and resulting amounts of residue. The first yield sensor(s) 222A may be configured as any suitable device, such as a camera(s) (including stereo camera(s), and/or the like), radar sensors, infrared sensors, microwave sensors, and/or the like.

Alternatively, or additionally, the harvester 10 may include one or more second yield sensors 222B provided as part of a yield monitoring system positioned on the harvester 10, such that the yield sensor(s) 222B may be positioned within the processing system of the harvester 10, e.g., at the threshing and separating assembly 24, the grain cleaning assembly 26, and/or at the residue hood 54, to detect parameters associated with the crop materials processed by the plant processing system, such as weight, which may be used to estimate the crop yield as well as the amount of residue being generated. The second yield sensor(s) 222B may be configured to more directly monitor the crop yield than the first yield sensor(s) 222A. In general, the yield data from either or both of the yield sensors 222A, 222B may be used as an estimate of the crop yield and the associated amount of residue being generated and subsequently expelled back into the field.

Additionally or alternatively, in some embodiments, as described above, one or more of the residue sensors 224 of the system 200 may be provided in operative association with the harvester 10 and configured to monitor the residue distribution of the residue deposited on the surface of the field 19 after the harvesting operation. For example, one or more residue sensors 224A may be positioned at an aft end of the harvester 10, e.g., at the residue hood 54. The residue sensor(s) 224A may generally have a field of view 225 directed towards the field surface 19 rearward of the harvester 10 in the direction of travel 21. The residue sensor(s) 224A may be configured to detect parameters associated with the distribution of the residue on the field surface 19, such as moisture content data, heat data, light reflectance data, or image data. When considering moisture content data, areas with higher moisture contents may have more residue coverage than areas with lower moisture contents. Similarly, areas with higher heat contents may have more (i.e., thicker) residue coverage than areas with lower heat contents. Conversely, areas with higher light reflectance may have less residue coverage than areas with lower light reflectance. Image data, particularly images of the field generated from such data, may be analyzed by an operator or may be automatically analyzed using one or more computer based algorithms to determine the residue coverage of the field. In some embodiments, the residue sensor(s) 224A may be configured as an IR sensor(s). Additionally, or alternatively, in some embodiments, the residue sensor(s) 224A may be configured as a radar sensor(s). Further, in some embodiments, the residue sensor(s) 224A may be configured as any other suitable device, such as a camera(s) (including stereo camera(s), and/or the like). LIDAR device(s) and other laser-based sensor(s), ultrasonic sensor(s), and/or the like.

It should be appreciated that the configuration of the harvester 10 described above and shown in FIG. 3 is provided only to place the present subject matter in an exemplary field of use. Thus, it should be appreciated that the present subject matter may be readily adaptable to any manner of harvester configuration.

Still referring to FIG. 3, as described above, the system 200 may further include one or more UAVs 102A, 102B configured to be flown over the field to collect aerial-based data. More particularly, in one embodiment, as described above with reference to FIG. 2, one or more of the yield sensors 222 and/or one or more of the residue sensors 224 of the system 200 may be provided in operative association with the UAV(s) 102A, 102B. For example, a first UAV(s) 102A may be flown across the field, generally before the performance of the harvesting operation, to allow a yield sensor(s) 222C to collect aerial-based data associated with an estimated or potential yield of the field. The yield sensor(s) 222C may generally be configured the same as or similar to the yield sensor(s) 222A. For instance, the yield sensor(s) 222C may be configured to detect parameters indicative of the density of the crop to be harvested, such as NDVI data or other image data. As such, the yield sensor(s) 222C may, in some embodiments be configured as an infrared sensor. In some embodiments, the yield sensor(s) 222C may be configured as a radar sensor. Alternatively or additionally, in some embodiments, the yield sensor(s) 222C may be configured as any other suitable device, such as a camera(s) (including stereo camera(s), and/or the like), LIDAR device(s) and other laser-based sensor(s), ultrasonic sensor(s), and/or the like. As such, the yield data from the yield sensor(s) 222C corresponds to an estimated crop yield.

Similarly, a second UAV(s) 102B may be flown across the field, generally following the harvesting operation, to allow a residue sensor(s) 224C to collect aerial-based data associated with the residue coverage of the field surface 19. The residue sensor(s) 224C may generally be configured the same as or similar to the residue sensor(s) 224A. For instance, as described above, the residue sensor(s) 224C may be configured to collect moisture content data, light reflectance data, heat data, or image data. As such, the residue sensor(s) 224C may, in some embodiments be configured as an IR sensor(s). In some embodiments, the residue sensor(s) 224C may be configured as a radar sensor(s). Alternatively or additionally, in some embodiments, the residue sensor(s) 224C may be configured as any other suitable device, such as a camera(s) (including stereo camera(s), and/or the like), LIDAR device(s) and other laser-based sensor(s), ultrasonic sensor(s), and/or the like.

It should be appreciated that, while only a respective one of the yield and residue sensors 222C, 224C is shown as being associated with each of the first and second UAVs 102A, 102B, a single one of the UAVs 102A, 102B may instead include both of the yield sensor(s) 222C and the residue sensor(s) 224C, such that a single UAV may be used to collect both residue and yield data.

It should also be appreciated that the UAV(s) 102A, 102B may generally correspond to any suitable aerial vehicle capable of unmanned flight, such as any UAV capable of controlled vertical, or nearly vertical, takeoffs and landings. For instance, in the illustrated embodiment, the UAV(s) 102A, 102B corresponds to a quadcopter. However, in other embodiments, the UAV(s) 102A, 102B may correspond to any other multi-rotor aerial vehicle, such as a tricopter, hexacopter, or octocopter. In still further embodiments, the UAV(s) 102A, 102B may be a single-rotor helicopter, or a fixed wing, hybrid vertical takeoff and landing aircraft.

Turning now to FIG. 4, as indicated above, the system 200 may further include a work vehicle and associated agricultural implement, such as the work vehicle 110 and the agricultural implement 112 described above with reference to FIG. 2. In the illustrated embodiment, the work vehicle 110 is configured as an agricultural tractor and includes a pair of front track assemblies 114 (only one of which is shown), a pair or rear track assemblies 116 (only one of which is shown) and a frame or chassis 118 coupled to and supported by the track assemblies 114, 116. An operator's cab 120 may be supported by a portion of the chassis 118 and may house various input devices for permitting an operator to control the operation of one or more components of the work vehicle 110 and/or one or more components of the implement 112. Additionally, as is generally understood, the work vehicle 110 may include an engine (not shown) and a transmission (not shown) mounted on the chassis 118 for driving the work vehicle 110.

Moreover, as shown in FIG. 4, the implement 112 may generally be configured as a tillage implement and include a carriage frame assembly 130 configured to be towed by the work vehicle 110 via a pull hitch or tow bar 132 in a travel direction of the vehicle (e.g., as indicated by arrow 134). As is generally understood, the carriage frame assembly 130 may support a plurality of ground-engaging tools, such as a plurality of ground engaging shanks 146, disk blades 150, leveling blades 152, basket assemblies 154, and/or the like. In several embodiments, the various ground-engaging tools may be configured to perform a tillage operation across the field along which the implement 112 is being towed.

In addition, the implement 112 may also include any number of suitable actuators (e.g., hydraulic cylinders) for adjusting the relative positioning, penetration depth, and/or down force associated with the various ground-engaging tools 146, 150, 152, 154. For instance, the implement 112 may include one or more first actuators 156 for allowing the penetration depth and/or the down pressure of the shanks 146 to be adjusted. Similarly, the implement 112 may include one or more second actuators 158 configured to adjust the penetration depth and/or the down pressure of the disk blades 150. Moreover, the implement 112 may include one or more third actuators 160 to allow the relevant operating parameters of the leveling blades 152 and basket assemblies 154 (e.g., the down pressure and/or the penetration depth) to be adjusted.

Additionally, as described above, in some embodiments, the work vehicle 110 and/or the implement 112 may include one or more of the residue sensors 224 of the system 200 coupled thereto and/or supported thereon for capturing data associated residue coverage of the field in front of the implement 112 in the direction of travel 134. Specifically, in several embodiments, one or more residue sensor(s) 224D may be provided in operative association with the work vehicle 110 and/or one or more residue sensors 224E may be provided in operative association with the implement 112 such that the sensor(s) 224D, 224E may have a field of view 225 directed towards a portion(s) of the field disposed in front of, behind, and/or along one or both of the sides of the work vehicle 110 and/or in front of the implement 112 as the implement 112 is being towed across the field. As such, the residue sensor(s) 224D, 224E may capture data corresponding to residue coverage of one or more portion(s) of the field being passed by the tractor 110 and/or implement 112. The residue sensor(s) 224D, 224E may generally be configured the same as or similar to the residue sensor(s) 224A. For instance, the residue sensor(s) 224D, 224E may be configured to collect moisture content data, light reflectance data, heat data, or image data, as described above. The residue sensor(s) 224D, 224E may, in some embodiments, be configured as an IR sensor(s). In some embodiments, the residue sensor(s) 224D, 224E may be configured as a radar sensor(s). Alternatively, or additionally, in some embodiments, the residue sensor(s) 224D, 224E may be configured as any other suitable device, such as a camera(s) (including stereo camera(s), and/or the like), LIDAR device(s) and other laser-based sensor(s), ultrasonic sensor(s), and/or the like.

It should be appreciated that the configuration of the work vehicle 110 and the implement 112 described above and shown in FIG. 4 are provided only to place the present subject matter in an exemplary field of use. Thus, it should be appreciated that the present subject matter may be readily adaptable to any manner of work vehicle configuration or implement configuration.

Figure 5:
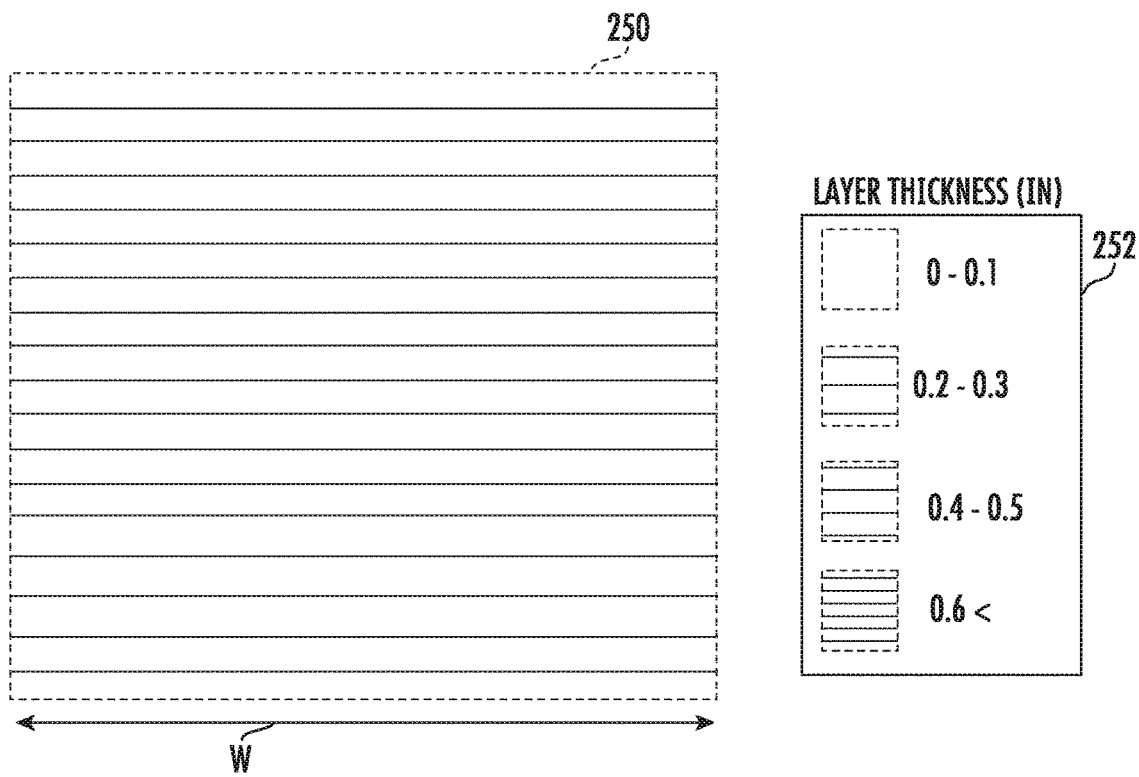
FIG. 5 illustrates an example view of an estimated residue coverage map generated in accordance with aspects of the present subject matter.
Figure 6:
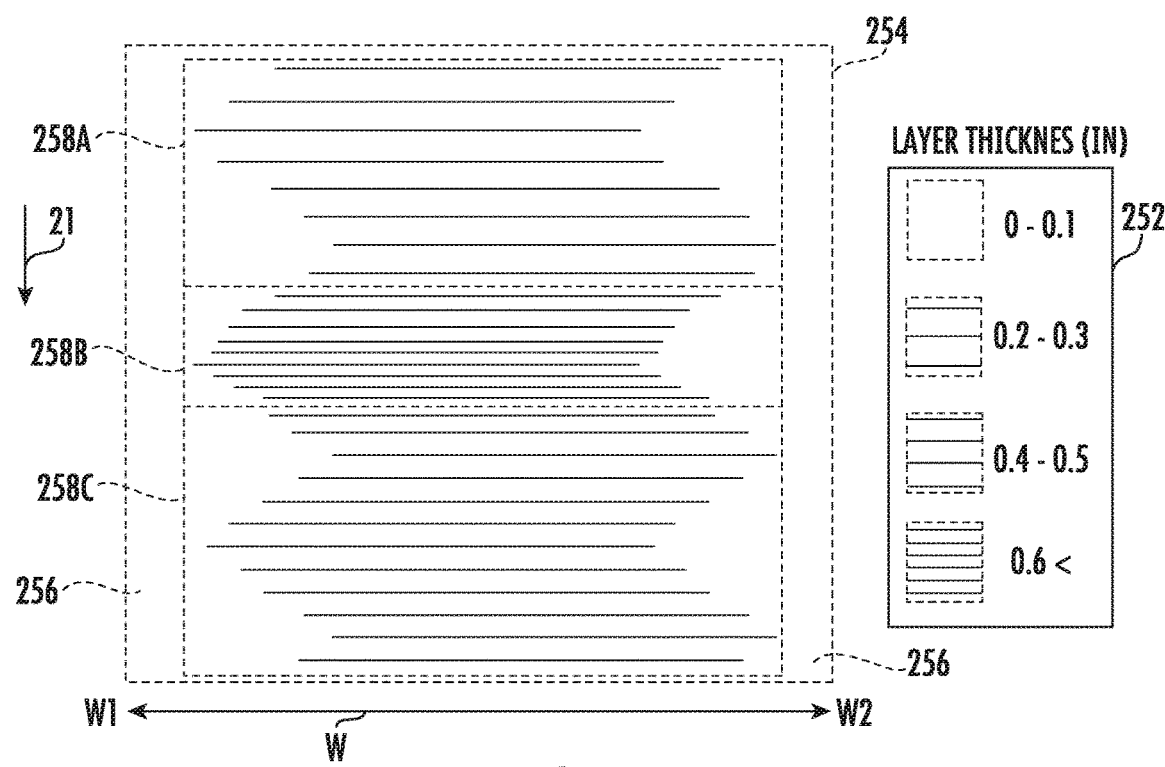
FIG. 6 illustrates an example view of an updated residue coverage map generated in accordance with aspects of the present subject matter.
Figure 7:
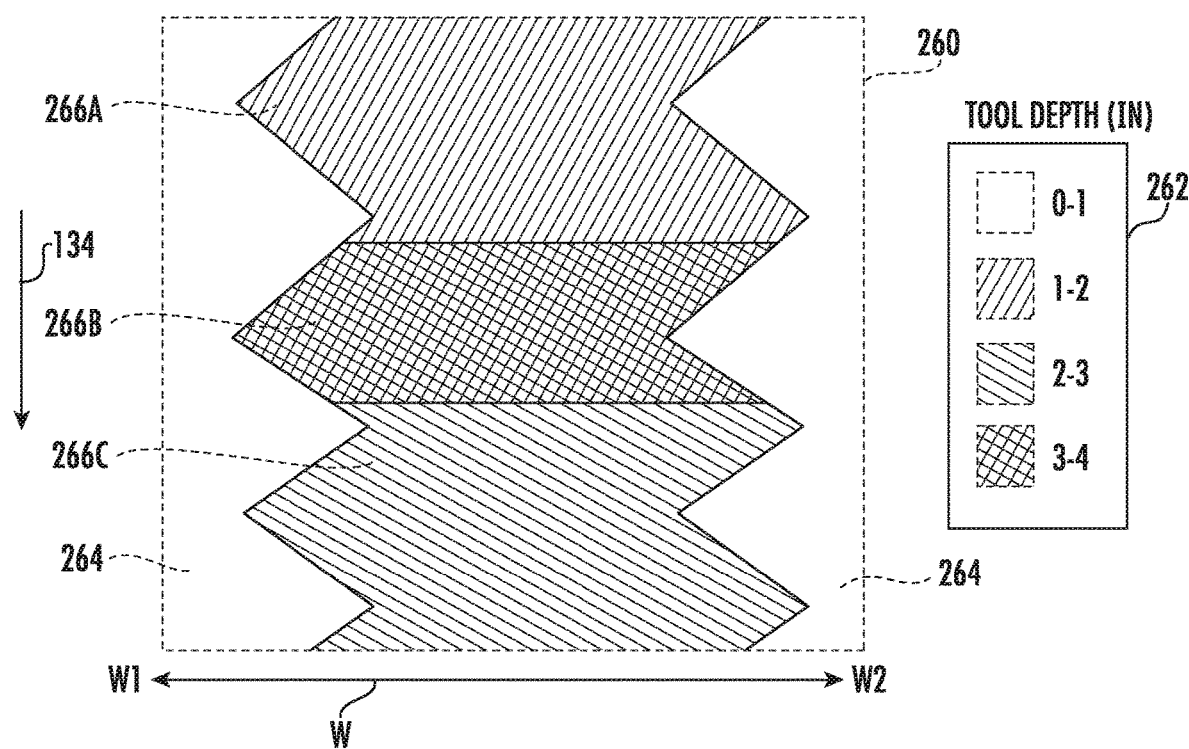
FIG. 7 illustrates an example view of a prescription tillage map generated in accordance with aspects of the present subject matter.

Referring now to FIGS. 5-7, example views of portions of residue and prescription maps that may be generated using the disclosed system 200 are illustrated in accordance with aspects of the present subject matter. Particularly, FIG. 5 illustrates a portion of an estimated residue coverage map generated based on yield data collected for a field either before or during a harvesting operation. FIG. 6 illustrates a portion of an updated residue coverage map generated based on residue data collected for the field following the performance of the harvesting operation, particularly illustrating an updated map for the portion of the field shown in FIG. 5. Additionally, FIG. 7 illustrates a portion of a prescription map generated based on the updated residue coverage map.

As indicated above, the computing device(s) 202 of the disclosed system 200 may be configured to generate a residue coverage map 250 for a field based on the yield data 212 (FIG. 1) received from the yield sensor(s) 222. FIG. 5 illustrates a portion of such residue coverage map 250 representing an estimate of the residue coverage of a specific section of the field, particularly the distribution and thickness of the residue across the field surface. Particularly, in some embodiments, the section of the field may represent a portion of a swath having a width W over which a harvesting operation of the harvester 10 takes place. As discussed above, the amount of residue generated from the harvesting operation that is estimated from the yield data 212 is generally assumed to be evenly distributed across the adjacent section of the field as the residue is expelled from the aft end of the harvester 10. Accordingly, the portion of the residue coverage map 250 shown in FIG. 5 illustrates an even or average thickness of residue 252 across the entire width W of the swath. However, as provided above, such residue coverage map 250 may be inaccurate. For example, depending on the speed of the harvester 10 and/or operation of the residue spreader 72, the residue may not be evenly distributed across the entire width W of the swath.

Accordingly, as noted above, the computing device(s) 202 may further be configured to generate an updated residue coverage map based on the residue coverage map 250 and the residue data 214 (FIG. 1) collected for the field following the harvesting operation. A portion of such updated residue coverage map 254 is illustrated in FIG. 6 and generally corresponds to the same section of the field illustrated in FIG. 5, i.e., a portion of a swath of the harvester 10. As shown in FIG. 6, based on the residue data collected, it was determined that the crop residue was not distributed evenly across the illustrated section of the field. Instead, the width W of the swath has certain regions 256 that are almost entirely void of residue. More particularly, the residue coverage 252 is thicker at the center of the width W, with the regions 256 being disposed towards the outer ends W1, W2 of the width W. This may, for example, be due to undesirable operation of the residue spreader 72. Further, in the areas of the portion of the field with residue, the thickness of the residue 252 changes along the direction of travel 21 of the harvester 10, with varying shading representing different residue thicknesses 252. For instance, along the travel direction 21, a first segment 258A of the portion of the field has a residue layer thickness that is less than a second segment 258B of the portion of the field, and a third segment 258C of the portion of the field has a residue layer thickness that is greater than the first segment 258A but less than the second segment 258C. Such changes in residue layer thickness may correspond, for example, to changes in speed of the harvester 10 or localized differences in crop density. The computing device(s) 202 may be configured to compare the residue coverage data from the residue coverage map 250 and the residue data 214 to develop the updated residue coverage map 254 indicating the actual residue coverage of the field. Such comparison may provide a more accurate indication of residue coverage across a field than using only one of the sensors 222, 224 alone, as the data from one of the sensors 222, 224 may be used to confirm data received from the other of the sensors 222, 224.

Moreover, as indicated above, the computing device(s) 202 may further be configured to generate a prescription map 260 based on the updated residue coverage map 254. A portion of such prescription map 260 is shown in FIG. 7, particularly illustrating the map 250 as a tillage prescription map. As is generally understood, a tillage prescription map may generally correlate a given tillage parameter for one or more ground engaging tools of the tillage implement 112 to a position within the field. Generally, the variation in the tillage parameter across a field will be determined based on variations in the amount of residue across the field. The tillage parameter may, in one embodiment, as shown in FIG. 7, include a penetration depth 262 associated with the one or more ground engaging tools of the implement 12, with varying shading representing different tillage tool depths 252. Generally, deeper tillage depths are associated with areas having thicker residue. For example, first zones 264 of the prescription tillage map 260 have the shallowest tillage depths and correspond to the zones 256 without residue of the updated residue coverage map 254 (FIG. 6). Similarly, a second zone 266A of the prescription tillage map 260 has a deeper tillage depth than the first zones 264 and corresponds to the first zone 258A of the updated residue coverage map 254 (FIG. 6). Further, a third zone 266B of the prescription tillage map 260 has a deeper tillage depth than the second zone 266A and corresponds to the second zone 258B of the updated residue coverage map 254 (FIG. 6). Additionally, a fourth zone 266C of the prescription tillage map 260 has a deeper tillage depth than the second zone 266A, but more shallow than the third zone 266B, the fourth zone 266C corresponding to the third zone 258C of the updated residue coverage map 254 (FIG. 6). Thus, as the implement 112 is towed along the direction of travel 134 of the implement 112, generally parallel to the direction of travel 21 of the harvester 10, the computing device(s) 202 may be configured to adjust the tool depth of one or more of the ground engaging tools 146, 150, 152, 154 across the width W of the swath as the implement 112 crosses boundaries between the zones 264, 266A, 266B, 266C according to the prescription tillage map, to account for variations in the residue coverage across the portion of the field.

It should be appreciated that, while the tillage prescription map 260 is discussed with reference to the tool depth 252 of the tillage implement 112, the tillage parameter may correspond to any other suitable parameter associated with the one or more ground engaging tools of the implement 112, such as tool angle and/or the speed at which the tillage implement 112 is towed. Further, it should be appreciated that, while the subsequent agricultural operation to the harvesting operation is discussed as being performed by the tillage implement 112, any other suitable agricultural implement may be configured to perform such subsequent agricultural operation, such as a planter and/or a sprayer.

Figure 8:
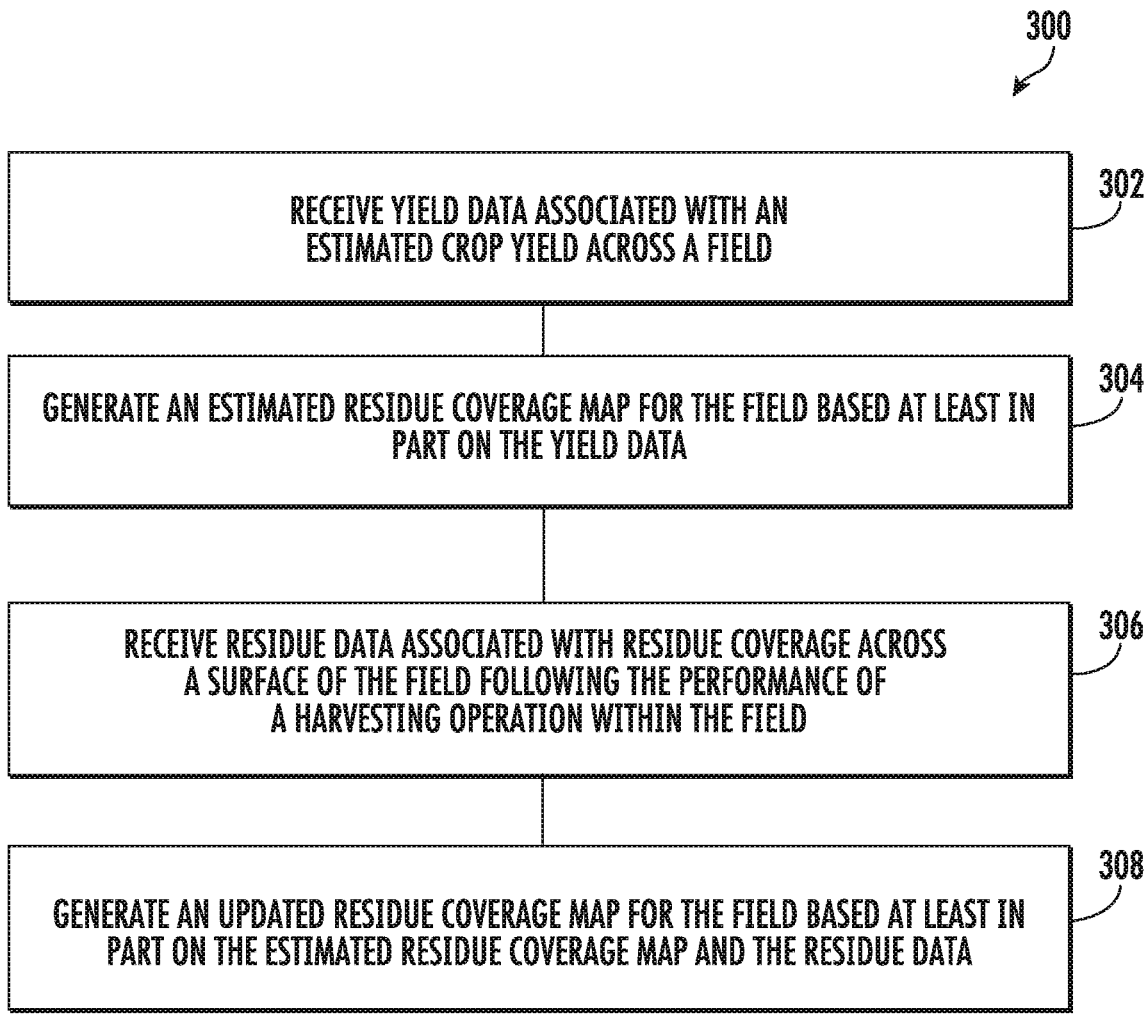
FIG. 8 illustrates a method for determining residue coverage of a field after a harvesting operation in accordance with aspects of the present subject matter Repeat use of reference characters in the present specification and drawings is intended to represent the same or analogous features or elements of the present technology.

Referring now to FIG. 8, a flow diagram of one embodiment of a method 300 for determining residue coverage of a field after a harvesting operation is illustrated in accordance with aspects of the present subject matter. In general, the method 300 will be described herein with reference to the system 200 shown in FIGS. 1 and 2, as well as the harvester 10, UAV(s) 102, work vehicle 110, and implement 112 shown in FIGS. 2, 3, and 4. However, it should be appreciated that the disclosed method 300 may be implemented within systems having any other suitable system configuration and/or with work vehicles and/or implements having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 may include receiving yield data associated with an estimated crop yield across a field. As indicated above, the computing device(s) 202 may receive yield data from one or more yield sensors 222 associated with an estimated crop yield across the field. For instance, the yield sensor(s) 222 may correspond to the first or second yield sensors 222A, 222B positioned on the harvester 10 and/or the yield sensor(s) 222C positioned on the UAV(s) 102A, 102B.

Further, at (304), the method 300 may include generating an estimated residue coverage map for the field based at least in part on the yield data. For instance, as indicated above, the computing device(s) 202 may generate an estimated residue coverage map 250 based at least in part on the yield data, with the residue coverage map 250 generally correlating the amount of residue generated by a harvesting operation to various location within the field. For instance, as indicated above, the yield data may be geo-referenced to allow the amount of crop residue being generated during the harvesting operation at each location within the field to be estimated, which can then be used to create the associated residue coverage map. As discussed above, the crop yield can be generally correlated to an amount of crop residue to be generated by a harvesting operation. The crop residue may be assumed to be evenly spread across the field, such that the residue coverage is consistent across the field at each location.

Moreover, at (306), the method 300 may include receiving residue data associated with residue coverage across a surface of the field following the performance of a harvesting operation within the field. As indicated above, the computing device(s) 202 may receive residue data from one or more residue sensors 224 associated with the residue coverage across a surface of the field following the performance of the same harvesting operation before or during which the associated yield data was captured. In various embodiments, the residue sensor(s) 224 may correspond to one or more of the residue sensor(s) 224A associated with the harvester 10, the residue sensor(s) 224C associated with the UAV(s) 102A, 102B, the residue sensor(s) 224D associated with the work vehicle 110, and/or the residue sensor(s) 224E associated with the implement 112. The residue sensor(s) 224 may detect parameters associated with crop residue, for example moisture content data, light reflectance data, heat data, or image data as discussed above, which may be correlated to an amount of crop residue present at the location within the field. The residue data may also be geo-referenced, as indicated above.

Additionally, at (308), the method 300 may include generating an updated residue coverage map for the field based at least in part on the estimated residue coverage map and the residue data. For instance, as described above, the computing device(s) 202 may be configured to compare the estimated amount of crop residue at each location of the field from the residue coverage map 250 to the amount of crop residue indicated by the residue data received from the one or more residue sensor(s) 224. The computing device(s) may then generate an updated residue coverage map 254 based at least in part on the comparison of the residue coverage map 250 and the residue data, indicating the residue coverage for each position within the field.

It is to be understood that, in several embodiments, the steps of the method 300 are performed by the computing device(s) 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the computing device(s) 202 described herein, such as the method 300, are implemented in software code or instructions Which are tangibly stored on a tangible computer readable medium. The computing device(s) 202 loads the software code or instructions via a direct interface with the computer readable medium or via a wired and/or wireless network. Upon loading and executing such software code or instructions by the computing device(s) 202, the computing device(s) 202 may perform any of the functionality of the computing device(s) 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining residue coverage within a field, the method comprising:
    receiving, with one or more computing devices, yield data associated with an estimated crop yield across a field, the yield data being generated by a yield sensor having a field of view directed upstream of where crop residue is expelled from a harvester during a performance of a harvesting operation by the harvester;
    generating, with the one or more computing devices, an estimated residue coverage map for the field based at least in part on the yield data;
    receiving, with the one or more computing devices, residue data associated with at least one of a thickness or a distribution of residue coverage across a surface of the field following the performance of the harvesting operation within the field, the residue data being generated by a residue sensor having a field of view directed towards the surface of the field after the performance of the harvesting operation; and
    generating, with the one or more computing devices, an updated residue coverage map for the field based at least in part on the estimated residue coverage map and the residue data.

2. The method of claim 1, further comprising controlling, with the one or more computing devices, an operation of an agricultural implement based at least in part on the updated residue coverage map during the performance of a second agricultural operation subsequent to the harvesting operation.

3. The method of claim 2, further comprising generating a prescription map for the field based at least in part on the updated residue coverage map, wherein controlling the operation of the agricultural implement comprises controlling the agricultural implement based at least in part on the prescription map for the field.

4. The method of claim 3, wherein the prescription map specifies at least one of a tool depth, tool angle, or speed of the agricultural implement for a plurality of different locations within the field.

5. The method of claim 1, wherein receiving the yield data comprises receiving the yield data from the yield sensor, the yield sensor being part of a yield monitoring system positioned on the harvester performing the harvesting operation or on an unmanned aerial vehicle (UAV) such that the yield data corresponds to an estimated crop yield of the harvesting operation.

6. The method of claim 1, wherein the residue sensor is positioned on the harvester performing the harvesting operation, on an unmanned aerial vehicle (UAV), or on an agricultural implement configured to perform a second agricultural operation subsequent to the harvesting operation.

7. The method of claim 6, wherein the residue sensor comprises an infrared sensor, a radar sensor, a LIDAR device, or a camera.

8. The method of claim 1, wherein the residue data comprises at least one of light reflectance data, heat data, or image data.

9. The method of claim 1, wherein receiving the yield data or the residue data comprises receiving geo-referenced data associated with at least one of the yield data or the residue data from a computing device remote to the one or more computing devices.

10. A system for determining residue coverage within a field, the system comprising:
a yield sensor that generates yield data indicative of an estimated crop yield for a field, the yield sensor having a field of view directed upstream of where crop residue is expelled from a harvester during a performance of a harvesting operation by the harvester;
a residue sensor that generates residue data indicative of at least one of a thickness or a distribution of residue coverage across a surface of the field following the performance of the harvesting operation within the field, the residue sensor having a field of view directed towards the surface of the field following the performance of the harvesting operation; and
one or more computing devices configured to:
receive the yield data from the yield sensor;
generate an estimated residue coverage map for the field based at least in part on the yield data;
receive the residue data from the residue sensor; and
generate an updated residue coverage map for the field based at least in part on the estimated residue coverage map and the residue data.

11. The system of claim 10, wherein the one or more computing devices are further configured to control an operation of an agricultural implement based at least in part on the updated residue coverage map during the performance of a second agricultural operation subsequent to the harvesting operation.

12. The system of claim 11, wherein the one or more computing devices are further configured to generate a prescription map for the field based at least in part on the updated residue coverage map, wherein the one or more computing devices are configured to control the operation of the agricultural implement based at least in part on the prescription map.

13. The system of claim 12, wherein the prescription map specifies at least one of a tool depth, tool angle, or speed of the agricultural implement for a plurality of different locations within the field.

14. The system of claim 10, wherein the yield sensor is part of a yield monitoring system positioned on the harvester performing the harvesting operation or on an unmanned aerial vehicle (UAV) such that the yield data corresponds to an estimated crop yield of the harvesting operation.

15. The system of claim 10, wherein the residue sensor is positioned on the harvester performing the harvesting operation, on an unmanned aerial vehicle (UAV), or on an agricultural implement configured to perform a second agricultural operation subsequent to the harvesting operation.

16. The system of claim 10, wherein the residue sensor comprises an infrared sensor, a radar sensor, a LIDAR device, or a camera.

17. The system of claim 11, wherein the agricultural implement is a tillage implement.

18. The system of claim 10, wherein the field of view of the yield sensor is directed towards the field such that the yield sensor generates data indicative of crop coverage across the field before the harvesting operation, the crop coverage being indicative of the estimated crop yield for the field.

19. The method of claim 1, wherein generating the estimated residue coverage map for the field based at least in part on the yield data comprises indicating in the estimated residue coverage map an estimated even thickness or an even constant distribution of residue coverage across an entire swath of the surface of the field expected to be present following the performance of the harvesting operation within the field based on the yield data.

* * * * *